United States Patent
Yamada et al.

(10) Patent No.: US 9,864,522 B2
(45) Date of Patent: Jan. 9, 2018

(54) MEMORY CARD

(71) Applicant: Panasonic Intellectual Property Management Co., Ltd., Osaka (JP)

(72) Inventors: Masahiro Yamada, Osaka (JP); Takeshi Otsuka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 14/838,349

(22) Filed: Aug. 27, 2015

(65) Prior Publication Data

US 2016/0062653 A1 Mar. 3, 2016

(30) Foreign Application Priority Data

Aug. 28, 2014 (JP) .................................. 2014-173670
Aug. 21, 2015 (JP) .................................. 2015-163388

(51) Int. Cl.
| G06F 3/06 | (2006.01) |
| G06F 13/28 | (2006.01) |
| G06F 13/38 | (2006.01) |

(52) U.S. Cl.
CPC ............ G06F 3/061 (2013.01); G06F 3/0655 (2013.01); G06F 3/0679 (2013.01); G06F 13/28 (2013.01); *G06F 2206/1014* (2013.01)

(58) Field of Classification Search
None
See application file for complete search history.

(56) References Cited

U.S. PATENT DOCUMENTS

| 5,422,856 A | 6/1995 | Sasaki et al. |
| 2003/0147297 A1 | 8/2003 | Shiota et al. |
| 2003/0202383 A1 | 10/2003 | Shiota et al. |
| 2005/0162929 A1 | 7/2005 | Shiota et al. |
| 2007/0285997 A1 | 12/2007 | Shiota et al. |
| 2009/0113119 A1 | 4/2009 | Oribe et al. |
| 2010/0023674 A1* | 1/2010 | Aviles ................ G06F 12/0813 711/103 |
| 2010/0054069 A1 | 3/2010 | Shiota et al. |

(Continued)

FOREIGN PATENT DOCUMENTS

| JP | 63192150 A | 8/1988 |
| JP | 06259320 A | 9/1994 |

(Continued)

*Primary Examiner* — Scott Sun
(74) *Attorney, Agent, or Firm* — McDermott Will & Emery LLP

(57) ABSTRACT

The memory card includes a non-volatile memory, an internal memory, a bus converter, and a media controller. The non-volatile memory is rewritable. The internal memory is configured to divide data transferred from a host into M (M is an integer of 2 or more) segments each of which including N (N is a natural number) times a minimum transfer unit of the non-volatile memory as a unit to record. The bus converter is configured to output 1/M of the minimum transfer unit of data in parallel from each of the M segments recorded in the internal memory. The media controller is configured to integrate 1/M of data belonging to each of different segments input in parallel from the bus converter as one minimum transfer unit of data to record in the non-volatile memory.

4 Claims, 6 Drawing Sheets

(56) References Cited

U.S. PATENT DOCUMENTS

| | | | |
|---|---|---|---|
| 2011/0047330 A1* | 2/2011 | Potapov | G06F 12/0207 |
| | | | 711/114 |
| 2012/0176842 A1 | 7/2012 | Shiota et al. | |
| 2014/0365712 A1 | 12/2014 | Shiota et al. | |

FOREIGN PATENT DOCUMENTS

| | | | |
|---|---|---|---|
| JP | 2000276402 A | 10/2000 |
| JP | 2003233529 A | 8/2003 |
| JP | 2008135046 A | 6/2008 |
| JP | 2008310459 A | 12/2008 |
| JP | 2009134682 A | 6/2009 |
| JP | 2011248558 A | 12/2011 |

\* cited by examiner

FIG. 4

Scatter Gather(SG) Table Format

| Parameter | Value |
|---|---|
| Source Address | X0 |
| Destination Address | V |
| Transfer Size | N0 |
| Next Table Address | Y+P |
| EOT(End Of Table) | 0 |
| Source Address | X1 |
| Destination Address | V+N0 |
| Transfer Size | N1 |
| Next Table Address | Y+P*2 |
| EOT(End Of Table) | 0 |
| Source Address | X2 |
| Destination Address | V+N0+N1 |
| Transfer Size | N2 |
| Next Table Address | Don't Care |
| EOT(End Of Table) | 1 |

SG Table0 — rows 1–5 (210)
SG Table1 — rows 6–10
SG Table2 — rows 11–15

Size = P Byte/Table

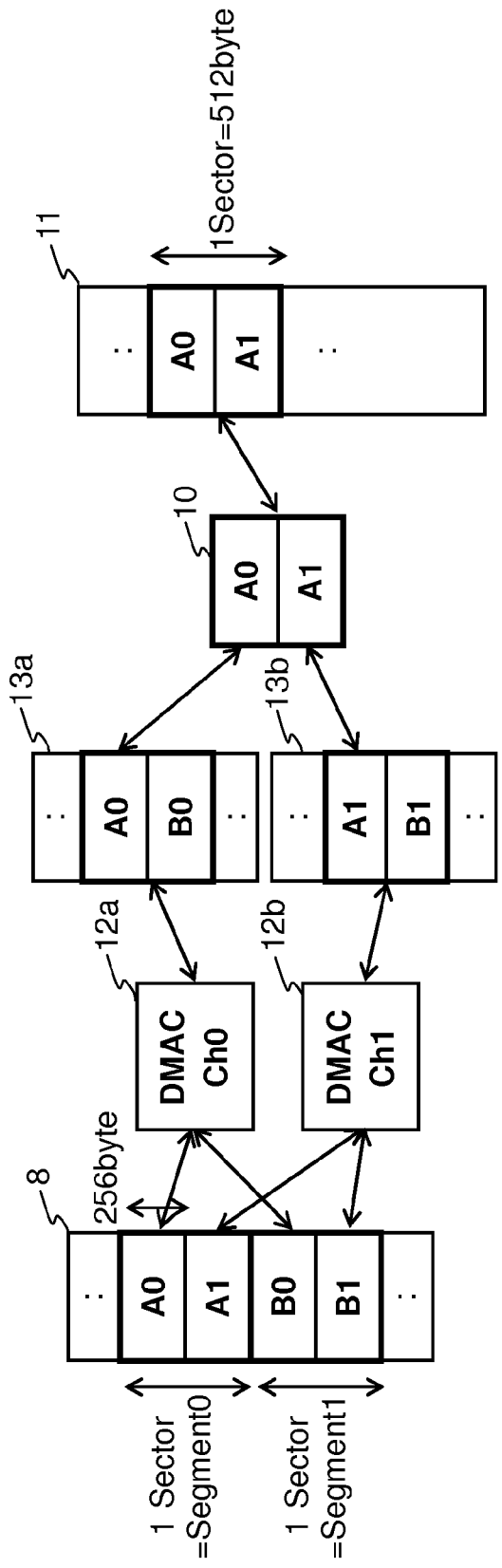

MEMORY CARD

RELATED APPLICATIONS

This application claims the benefit of Japanese Application No. 2014-173670, filed on Aug. 28, 2014 and Japanese Application No. 2015-163388, filed on Aug. 21, 2015, the disclosures of which are incorporated by reference herein.

BACKGROUND OF THE INVENTION

1. Field of the Invention

The present disclosure relates to a memory card performing, in parallel, transfer of data recorded in a sector of a non-volatile memory.

2. Description of Related Art

A flash memory card including a buffer memory is disclosed in Unexamined Japanese Patent Publication No. 2003-233529. In detail, the operating speed of the flash memory, in particular the writing or rewriting operation speed is slow compared to the operating speed of the host device to be connected to the flash memory card, and therefore, it is disclosed to absorb the difference of the operation speed in the buffer memory.

By the way, in order to parallelize transfer of data recorded in the non-volatile memory, a method in which a minimum transfer unit of a conventional non-volatile memory is transferred as a segment is conceivable. However, in this method, the non-data transfer interval occurs frequently, and therefore, the transfer rate is deteriorated.

The present disclosure provides a memory card in which the non-data transfer interval is reduced by integrating a plurality of minimum transfer units of the non-volatile memory as a segment, thereby achieving performance improvement.

SUMMARY OF THE INVENTION

The memory card in the present disclosure includes a non-volatile memory, an internal memory, a bus converter, and a media controller. The non-volatile memory is rewritable. The internal memory is configured to divide data transferred from a host into M (M is an integer of 2 or more) segments each of which including N (N is a natural number) times a minimum transfer unit of the non-volatile memory as a unit to record. The bus converter is configured to output 1/M of the minimum transfer unit of data in parallel from each of the M segments recorded in the internal memory. The media controller is configured to integrate 1/M of data belonging to each of different segments input in parallel from the bus converter as one minimum transfer unit of data to record in the non-volatile memory.

The memory card in the present disclosure parallelizes the transfer of data recorded in a sector of a non-volatile memory, thereby achieving performance improvement.

BRIEF DESCRIPTION OF DRAWINGS

FIG. 4 is a diagram illustrating an example of a SG Table for describing a DMA transfer method in the present exemplary embodiment;

FIG. 5 is a schematic diagram for illustrating a conventional data transfer method.

DETAILED DESCRIPTION OF THE PREFERRED EMBODIMENTS

In the following, the present exemplary embodiment will be described in detail with reference to the accompanying drawings appropriately. However, a detailed description more than necessary may be omitted. For example, a detailed description of the already well-known matters and a substantially overlapping description for the same configuration may be omitted. This is to avoid that the following description is unnecessarily redundant, and to facilitate the understanding of those skilled in the art.

It should be noted that the accompanying drawings and the following description are provided so that those skilled in the art fully understand the present disclosure, and that it is not intended to limit the subject matter described in the claims by these.

Present Exemplary Embodiment

In the following, the present exemplary embodiment will be described with reference to FIGS. 1 to 6.

[1-1. Configuration]

Figure 1:
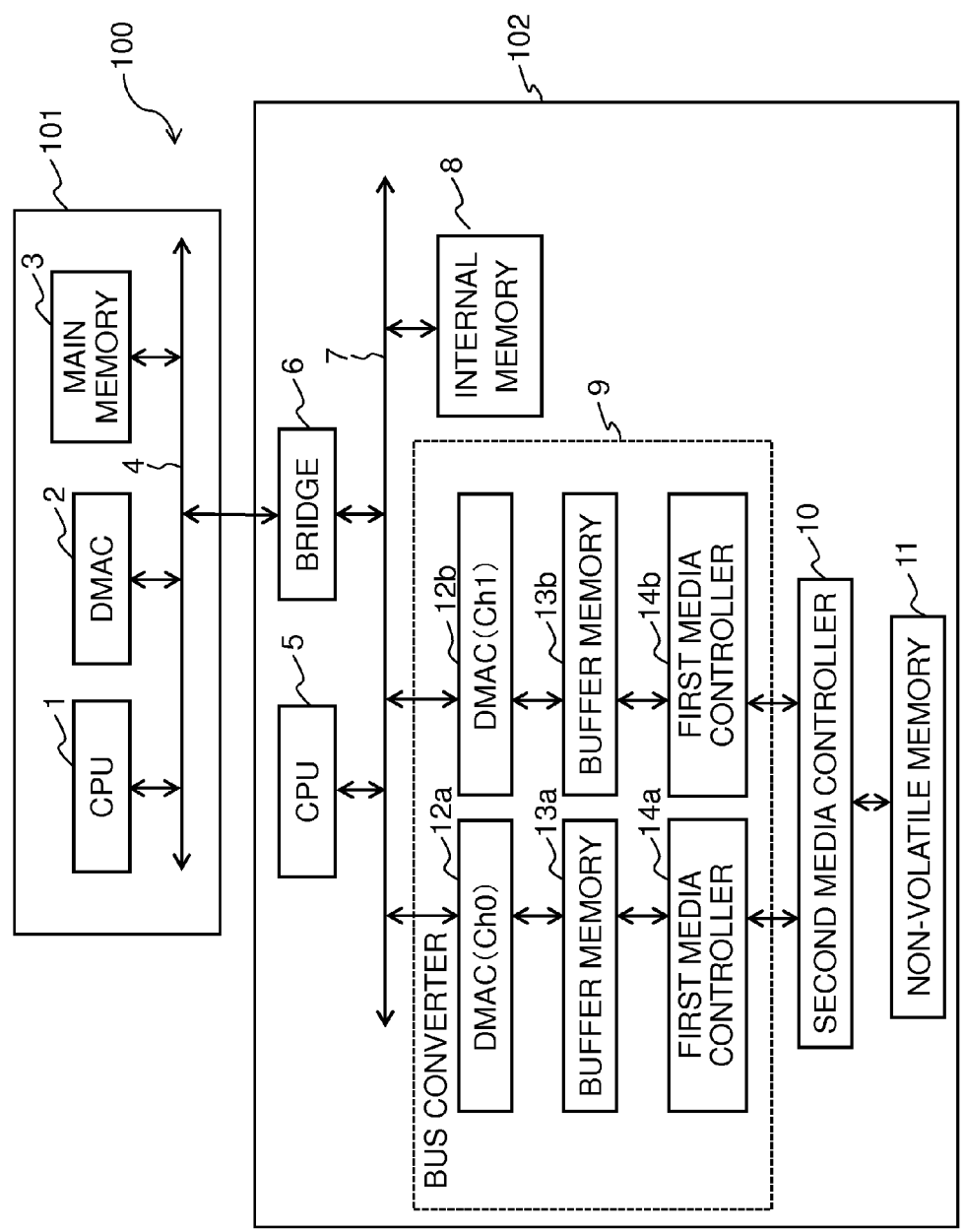
FIG. 1 is a block diagram showing a configuration of a memory card system in a present exemplary embodiment.

FIG. 1 is a block diagram showing a configuration of a memory card system in the present exemplary embodiment.

Memory card system 100 includes host system 101 and memory card 102. Host system 101 includes CPU 1, DMAC (DMA Controller) 2 controlled by CPU 1, main memory 3, and host common bus 4 connecting CPU 1, DMAC 2, and main memory 3.

Memory card 102 includes CPU 5, bridge 6, internal memory 8, bus converter 9, second media controller 10, and non-volatile memory 11 (specifically, Embedded SD, hereinafter referred to as "eSD"). Bridge 6 performs the protocol conversion between host common bus 4 and memory card common bus 7. Second media controller 10 controls the writing and reading to non-volatile memory 11.

Bus converter 9 is controlled by CPU 5, and transfers the data in parallel between internal memory 8 and second media controller 10. To that end, bus converter 9 includes two systems of respective DMACs 12a and 12b, buffer memories 13a and 13b, and first media controllers 14a and 14b.

In addition, bus converter 9 performs the protocol conversion between memory card common bus 7 and the bus between first media controllers 14a and 14b and second media controller 10. A specific example of memory card common bus 7 includes AHB bus. A specific example of the bus between first media controllers 14a and 14b and second media controller 10 includes the eSD I/F bus corresponding to the HighSpeed transfer mode.

Figure 2:
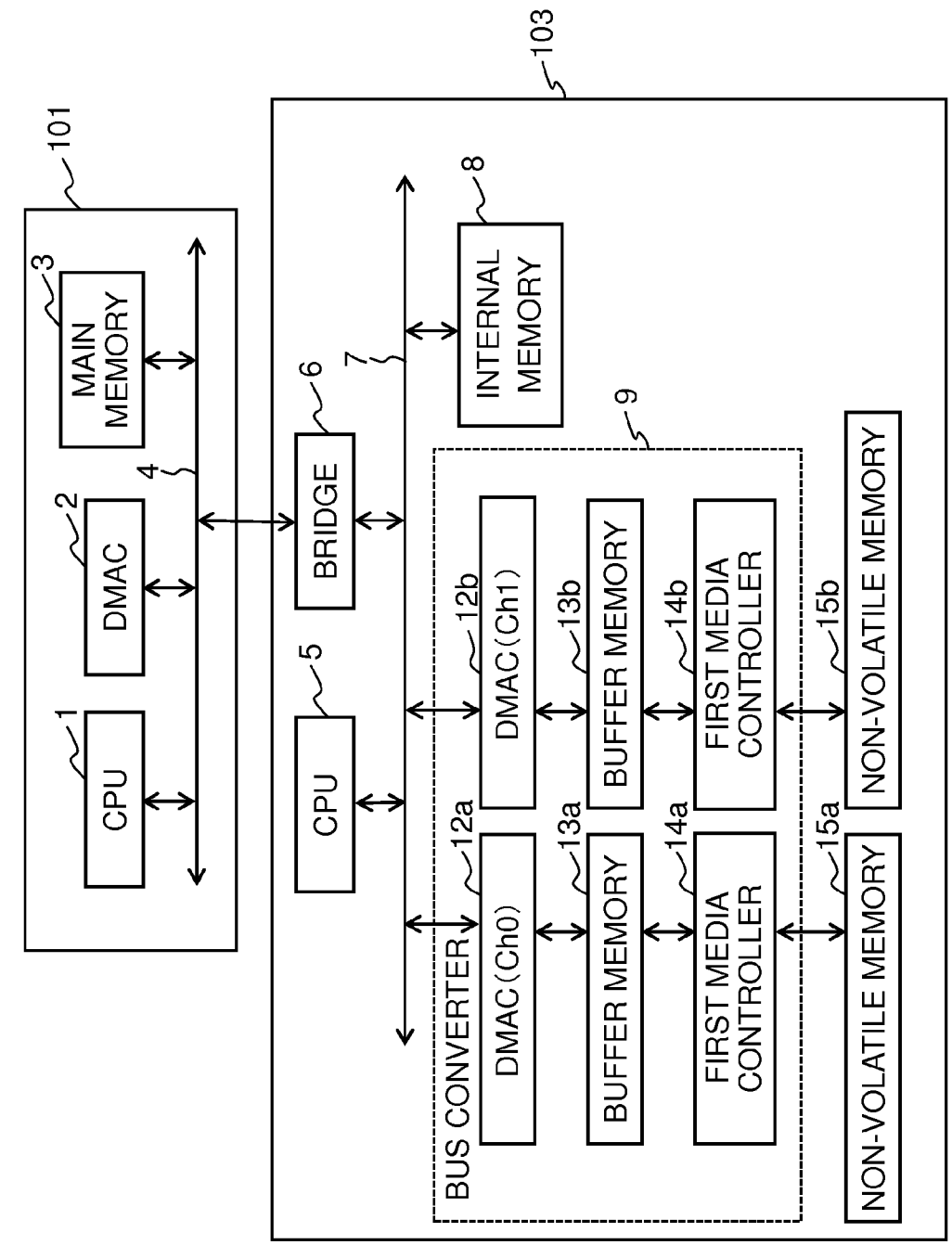
FIG. 2 is a block diagram for illustrating a background leading to the configuration of the memory card system in FIG. 1.

Here, the background leading to the configuration of the memory card system in FIG. 1 will be described with reference to FIG. 2. The memory card system in FIG. 2 has a configuration in which the portion of memory card 102 in the memory card system in FIG. 1 is replaced with memory card 103.

First, conventional non-volatile memories 15a and 15b have small capacity, and the write and rewrite operation speed is slow. Therefore, the transfer of data to be recorded in non-volatile memories 15a and 15b is parallelized by using bus converter 9, and the parallelized data have been respectively transferred from first media controllers 14a and 14b to non-volatile memories 15a and 15b. Thus, both of larger capacity and higher speed have been achieved.

However, in recent years, the non-volatile memory has advanced to a larger capacity, and the write and rewrite operation speeds have been also increased, and furthermore, new I/F specifications (specifically, the UHS-I/UHS-II: UltraHighSpeed1/UltraHighSpeed2) have been developed. However, an enormous amount of cost and man-hour are required to newly develop all the optimal system corresponding to the new I/F specifications. Thus, by using an existing legacy device, in other words, bus converter 9, only the I/F unit of non-volatile memory 11 has been determined to be newly developed while a configuration for parallelizing transfer of data recorded in non-volatile memory 11 having larger capacity and higher speed is maintained. As a result, the development cost and man-hour can be significantly reduced, and the products corresponding to new non-volatile memory 11 can be promptly brought to the market.

As described above, the present exemplary embodiment presupposes a configuration that uses bus converter 9 being a legacy device.

In FIG. 1, when a data transfer is performed between main memory 3 and internal memory 8 and between internal memory 8 and buffer memories 13a and 13b, a data transfer method referred to as "DMA (Direct Memory Access)" is used. DMA is a method of performing direct data transfer between memories or between I/O devices without going through the CPU.

The circuit for controlling the DMA transfer method is DMAC. In FIG. 1, DMAC 2 in host system 101 performs data transfer control between main memory 3 in host system 101 and internal memory 8 in memory card 102. In addition, DMACs 12a and 12b in bus converter 9 in memory card 102 performs data transfer control between internal memory 8 in memory card 102 and buffer memories 13a and 13b in bus converter 9.

[1-2. Operation]

In the following, the operation of DMAC 2 in host system 101 in the present exemplary embodiment is exemplified, whereby the outline of the DMA transfer method will be described.

[1-2-1. Outline of DMA Transfer]

Figure 3A:
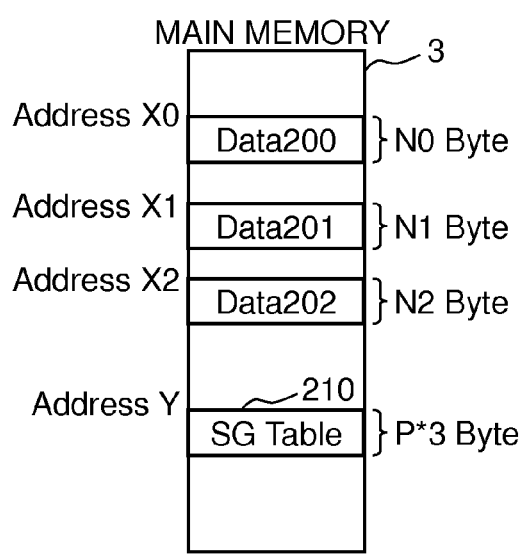
FIG. 3A is a schematic diagram showing an arrangement of data in a main memory in the present exemplary embodiment.

The transfer data disposed in main memory 3 in host system 101 are not always arranged in the continuous area as in FIG. 3A. In case of transferring the data discontinuously arranged in main memory 3, when CPU 1 controls DMAC 2 for each of the data (Data200 to Data202), a non-data transfer interval occurs, and therefore, the transfer rate is reduced. The non-data transfer interval is an interval used for the register settings such as the transfer source address and the transfer destination address, the interrupt processing, and the like. To improve this, CPU 1 generates a list where the parameters related to the transfer data are described, called a Scatter-Gather (Scatter/Gather) table (hereinafter referred to as "SG Table"), and DMAC 2 performs the DMA transfer in accordance with the SG Table. The continuous transfer can thus be performed, and the reduction in the transfer rate can be prevented.

In the following, a typical parameter set used in the SG Table is shown. When a plurality of data are transferred, the following parameter set is created as many as the number of the transfer data, and is listed.

Start address of the memory where the transfer source data are disposed (SourceAddress)
Start address of the destination memory (DestinationAddress);
Transfer size (TransferSize)
Start address of the memory where the next SG Table is disposed (NextTableAddress)
End information of SG Table (EndOfTable)

Figure 3B:
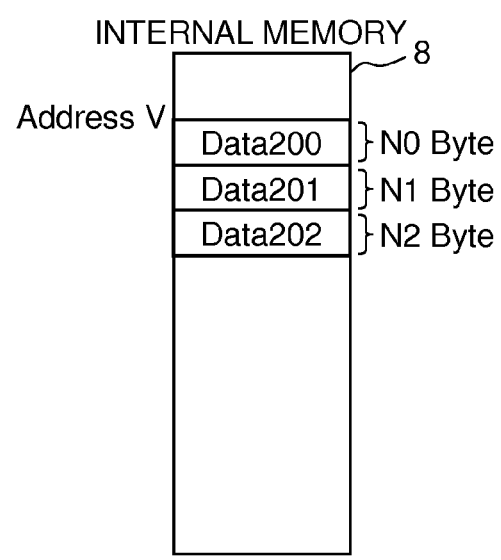
FIG. 3B is a schematic diagram showing an arrangement of data in an internal memory in the present exemplary embodiment.

A state where DMAC 2 in host system 101 transfers a plurality of data arranged dispersedly in main memory 3 to internal memory 8 in memory card 102 by using the SG Table will be described with reference to FIGS. 3A, 3B, and 4.

FIG. 3A is a data arrangement diagram of main memory 3, and three types of data of Data200 where N0 Byte is arranged from address X0, Data201 where N1 Byte is arranged from address X1, and Data202 where N2 Byte is arranged from address X2 are present. These data are transferred to the continuous area from address V of internal memory 8 shown in FIG. 3B. The SG Table to be generated has the size per one set as a fixed size of P Byte, and is arranged from address Y of main memory 3 in FIG. 3A. It should be noted that, this time, the size per one SG Table is set to be fixed, and therefore, the parameters of NextTableAddress indicating the start address of the next SG Table in FIG. 4 are automatically determined. Therefore, it is also possible to omit the parameters of NextTableAddress.

CPU 1 generates three tables of SG Table0 to 2 shown in FIG. 4, and sets start address Y of the SG Table in DMAC 2 to start. DMAC 2 reads the first SG Table0, and transfers N0 Byte from address X0 of main memory 3 to address V of internal memory 8 in memory card 102 via bridge 6. After the transfer is completed, DMAC 2 evaluates the parameters "EOT (EndOfTable)" of SG Table0, and reads the following SG Table1 from address (Y+P) of the next SG Table because the EOT (EndOfTable) of SG Table0 has a value of "0". Furthermore, DMAC 2 transfers data from main memory 3 to internal memory 8 in the same manner as in the case of SG Table0. DMAC 2 performs the above transfer until the transfer of SG Tablet where the parameters "EOT (EndOfTable)=1" of the SG Table are set is completed.

Upon completion of the transfer from main memory 3 to internal memory 8, DMAC 2 notifies CPU 1 of the completion, and CPU 1 having received the notification notifies CPU 5 in memory card 102 of the completion of transfer to internal memory 8.

After generating the respective SG Tables for transferring to buffer memories 13a and 13b, CPU 5 having received the notification starts the DMAC 12a and 12b. Then, DMACs 12a and 12b perform the transfer of data in the same manner as DMAC 2.

In the conventional method of transferring the minimum transfer unit of a non-volatile memory as a segment, the non-data transfer interval occurs frequently, and therefore, the transfer rate is deteriorated. It is the data transfer method in the present exemplary embodiment that solves this problem. In the following, the conventional data transfer method and the data transfer method in the present exemplary embodiment will be described.

[1-2-2. Conventional Data Transfer Method]

FIG. 5 is a schematic diagram for illustrating a conventional data transfer method. Specifically, it is a schematic diagram for illustrating a write operation of transferring data from internal memory 8 to non-volatile memory 11 in memory card 102.

CPU 5 having received the notification from CPU 1 generates the SG Tables in DMACs 12a and 12b.

When the minimum transfer unit of non-volatile memory 11 (sector) is set to 512 bytes, CPU 5 generates the SG Tables set in DMACs 12a and 12b so as to read by switching the address from internal memory 8 in 256 bytes unit. That is, the SG Table to be set in DMAC 12a is generated so that the first half 256 bytes of the minimum transfer unit of non-volatile memory 11 (A0, B0, . . . ) are transferred from internal memory 8 to buffer memory 13a. In addition, the SG Table to be set in DMAC 12b is generated so that the second half 256 bytes of the minimum transfer unit of non-volatile memory 11 (A1, B1, . . . ) are transferred from internal memory 8 to buffer memory 13b.

When 256 bytes or more of data are stored in each of buffer memories 13a and 13b, bus converter 9 outputs the data from first media controllers 14a and 14b to second media controller 10. The second media controller 10 integrates the data sent from each of the buffer memories into 512 bytes (A0, A1) being the minimum transfer unit of non-volatile memory 11, to record in the non-volatile memory 11.

At this time, the data transferred by DMACs 12a and 12b are discontinuous in 256 bytes unit in internal memory 8, and therefore, it is necessary to prepare a very large number of SG Tables. For example, when 1 MB of data in internal memory 8 are transferred, the number of the SG Tables set in each of DMACs 12a and 12b is required as many as 2048 (1 MB÷2 in parallel÷256 bytes). That is, DMACs 12a and 12b interpret and read the SG Table every time 256 bytes of data are transferred, and therefore, the data to be transferred from internal memory 8 to non-volatile memory 11 are temporarily suspended, and the transfer rate is deteriorated.

Similarly, in the conventional data transfer method, also in the read operation of transferring data from non-volatile memory 11 to internal memory 8, the data to be transferred are temporarily suspended, and the transfer rate is deteriorated. This is because, for example, in the case of reading 1024 sectors (512 KB) of data, 2048 SG Tables are still necessary per 1 Ch of the DMAC, and moreover, the data must be transferred for each 256 bytes.

[1-2-3. Data Transfer Method in the Present Exemplary Embodiment]

Figure 6:
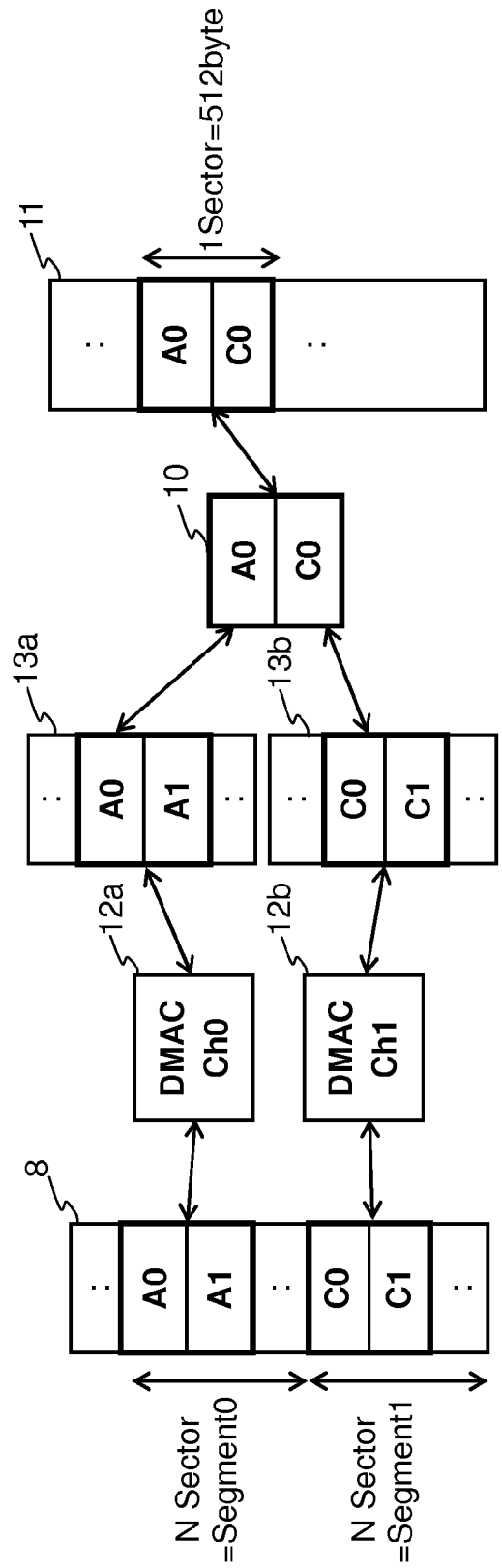
FIG. 6 is a schematic diagram for illustrating a data transfer method in the present exemplary embodiment.

FIG. 6 is a schematic diagram for describing the data transfer method in the present exemplary embodiment. Specifically, FIG. 6 is a schematic diagram for describing a write operation of transferring data from internal memory 8 to non-volatile memory 11 in memory card 102. FIG. 6 is also a schematic diagram for describing a read operation of transferring data from non-volatile memory 11 to internal memory 8 in memory card 102.

(Write Operation)

First, the write operation of transferring data from internal memory 8 to non-volatile memory 11 will be described.

As shown in the left end of FIG. 6, CPU 5 divides internal memory 8 into Segment0 and Segment1 in N sectors unit, and generates the SG Tables so as to read by switching the address from internal memory 8 in N sectors unit. That is, the SG Table for DMAC 12a transferring the data (A0, A1, . . . ) of Segment0 to buffer memory 13a is generated by CPU 5. In addition, the SG Table for DMAC 12b transferring the data (C0, C1, . . . ) of Segment1 to buffer memory 13b is also generated by CPU 5. The description of the processing in and after buffer memories 13a and 13b will be omitted because the processing is the same as in the conventional data transfer method. It should be noted that the data in the sector to be recorded in non-volatile memory 11 become (A0, C0), and that the result is different from the result of the transfer in the conventional data transfer method.

When DMACs 12a and 12b transfer the data to buffer memories 13a and 13b, the data in each of the Segments of internal memory 8 are present in the continuous area. Therefore, there is no need to read SG Table frequently in the middle of data transfer as in the conventional data transfer method, and it is possible to set a large transfer unit. Therefore, the transfer performance is improved as compared with the conventional data transfer method.

For example, in the same manner as the example used in the conventional data transfer method, a case of transferring 1 MB of data in internal memory 8 will be described. In this case, while as many as 2048 SG Tables have been required per DMAC 1Ch in the conventional data transfer method, only one SG Table is required in the data transfer method in the present exemplary embodiment by setting 1024 sectors (512 KB) as 1 Segment. Therefore, it is possible to transfer 512 KB collectively, instead of the data transfer interrupted for each 256 bytes.

In addition, when the hardware for implementing the conventional data transfer method is already available, a high-speed data transfer method in the present exemplary embodiment can be achieved by changing only the control software for CPU 5, without having to change the hardware configuration.

(Read Operation)

Next, a read operation of transferring data from non-volatile memory 11 to internal memory 8 will be described.

As shown in the right end of FIG. 6, in nonvolatile memory 11, data where 512 bytes (A0, C0) being the minimum transfer unit of non-volatile memory 11 are set as 1 sector are recorded.

Second media controller 10 reads data from non-volatile memory 11 for each minimum transfer unit of non-volatile memory 11, and divides each of the read data in ½ to output in parallel to bus converter 9. Specifically, the 512 bytes (A0, C0) are divided into two parts of the first half 256 bytes (A0) and the second half 256 bytes (C0) of the minimum transfer unit of non-volatile memory 11. Then, the first half 256 bytes (A0) are output to first media controller 14a in bus converter 9, and the second half 256 bytes (C0) are output to first media controller 14b in bus converter 9.

Each of first media controllers 14a and 14b records the data sent from second media controller 10 in the corresponding one of buffer memories 13a and 13b.

When 1 Segment of data is stored in each of buffer memories 13a and 13b, DMACs 12a and 12b transfer the data to internal memory 8. DMAC 12a reads the SG Table for transferring data (A0, A1, . . . ) of Segment0 to internal memory 8, and transfers the data based on the SG Table. In addition, DMAC 12b reads the SG Table for transferring data (C0, C1, . . . ) of Segment1 to internal memory 8, and transfers the data based on the SG Table.

When 1024 sectors (512 KB) are set as 1 Segment, it is possible to transfer data collectively for each 512 KB. In this case, while as many as 2048 SG Tables have been required per DMAC 1Ch in the conventional data transfer method, only one SG Table is sufficient. In addition, it is possible to transfer 512 KB collectively, instead of the data transfer interrupted for each 256 bytes in the conventional data transfer method. Therefore, a high-speed data transfer method can be achieved. Then, the data continuous in 512 KB unit are recorded in internal memory 8.

In the read operation, the minimum transfer unit of data of non-volatile memory 11 read from non-volatile memory 11 are divided in ½ to be input in parallel to bus converter 9 in second media controller 10, and are stored in each of the segments of internal memory 8.

[1-3. Effects, etc.]

As described above, memory card 102 in the present exemplary embodiment includes non-volatile memory 11, internal memory 8, bus converter 9, and second media controller 10. Internal memory 8 records the data transferred from host system 101 by dividing the data into two segments each of which includes N times the minimum transfer unit of non-volatile memory 11 as a unit. Bus converter 9 outputs ½ of the minimum transfer unit of data of non-volatile memory 11 in parallel by using two ports from each of the two segments recorded in internal memory 8. Second media controller 10 outputs ½ of the minimum transfer unit of the data of non-volatile memory 11 input from each of the two ports to one port to record in non-volatile memory 11. Then, by using second media controller 10, two of ½ of the minimum transfer unit of data belonging to different segments are integrated as one minimum transfer unit of data to be recorded in non-volatile memory 11. Thus, the recording method of non-volatile memory 11 is devised, whereby the transfer unit of bus converter 9 can be increased, and the transfer performance can be improved.

Other Exemplary Embodiments

As described above, the present exemplary embodiment is described as an example of the technique disclosed in the present application. However, the technique in the present disclosure is not limited thereto, and can also be applied to the exemplary embodiments where changes, substitutions, additions, omission, and the like are performed.

Therefore, in the following, other exemplary embodiments will be illustrated.

Although in the present exemplary embodiment, the case of DMAC including two channels of DMACs 12a and 12b is described as an example of bus converter 9, bus converter 9 may be sufficient as long as it can parallelize the data transfer between internal memory 8 and second media controller 10. Therefore, the number of DMACs is not limited to two channels.

In addition, although the case where a plurality of DMACs built in bus converter 9 are one-to-one connected to memory card common bus 7 is described, for example, a system where a plurality of virtual DMACs operate whereas the number of ports connected to memory card common bus 7 is one, such as VC (virtual channel) of PCI Express, may be used.

Furthermore, there is no limit to the I/F specification between bus converter 9 and second media controller 10, and therefore, first media controllers 14a and 14b built in bus converter 9 may be omitted, and second media controller 10 may directly control buffer memories 13a and 13b.

Moreover, when a sufficient continuous area can be secured in main memory 3, the SG Table read by DMACs 12a and 12b may be generated so as to be directly transferred from main memory 3 to buffer memories 13a and 13b.

The present disclosure is applicable to a memory card where high-speed data transfer is required. Specifically, the present disclosure is applicable to broadcast cameras, editing devices, etc. capable of high bit rate recording.

What is claimed is:

1. A memory card comprising:
a rewritable non-volatile memory;
an internal memory configured to divide data transferred from a host into M (M is an integer of 2 or more) segments each of which including N (N is a natural number) times a minimum transfer unit of the non-volatile memory as a unit to record;
a bus converter configured to output 1/M of the minimum transfer unit of data in parallel from each of the M segments recorded in the internal memory; and
a media controller configured to integrate 1/M of the data belonging to each of different segments input in parallel from the bus converter as one minimum transfer unit of data to record in the non-volatile memory.

2. The memory card according to claim 1, wherein the minimum transfer unit of data read from the non-volatile memory are divided in 1/M in the media controller to be input in parallel to the bus converter, and stored in each of the segments of the internal memory.

3. The memory card according to claim 1, wherein the minimum transfer unit is a sector-by-sector basis.

4. The memory card according to claim 1, wherein the non-volatile memory is a flash memory.

* * * * *